(12) United States Patent
Anderson et al.

(10) Patent No.: US 6,362,654 B1
(45) Date of Patent: Mar. 26, 2002

(54) BIDIRECTIONAL REPEATER USING HIGH AND LOW THRESHOLD DETECTION

(75) Inventors: Alma Anderson, Rio Rancho; Paul Andrews, Sandia Park, both of NM (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/641,179

(22) Filed: Aug. 17, 2000

(51) Int. Cl.$^7$ .......................................... H03K 19/0175
(52) U.S. Cl. ............................. 326/82; 326/80; 326/21
(58) Field of Search ........................... 326/62, 80, 81, 326/83, 86, 90, 82

(56) References Cited

U.S. PATENT DOCUMENTS

| | | | | |
|---|---|---|---|---|
| 5,859,545 A | * | 1/1999 | Thornblad | 326/82 |
| 5,877,633 A | * | 3/1999 | Ng et al. | 326/80 |
| 5,923,187 A | * | 7/1999 | Maugars | 326/80 |
| 6,218,862 B1 | * | 4/2001 | Meyer | 326/82 |

* cited by examiner

Primary Examiner—Michael Tokar
Assistant Examiner—Don Phu Le
(74) Attorney, Agent, or Firm—Harold Tsiang

(57) ABSTRACT

A repeater employs multiple threshold detectors to distinguish between signals from external devices and signals generated within the repeater. Signals that are sent from the repeater are configured to be between two threshold levels, so that a detector at one threshold level will detect an active signal, but the detector at the other threshold level will not detect an active signal. When an external signal is received on one side (A) of the repeater, it is propagated to the other side (B) of the repeater, and at the same time, the other side (B) of the repeater is configured to only propagate external signals back to the first side (A). In this manner, the internally generated signal from one side (A) is not propagated back to the same side (A), and a latch-up is avoided. In like manner, when an external signal is received at the other side (B), the first side (A) of the repeater is configured to propagate only externally generated signals. If both sides of the repeater are externally driven, the active signal is propagated to both sides of the repeater, thereby emulating the response that would be provided by a wired bus without a repeater. The repeater is particularly well suited for an I$^2$C bus architecture.

13 Claims, 3 Drawing Sheets

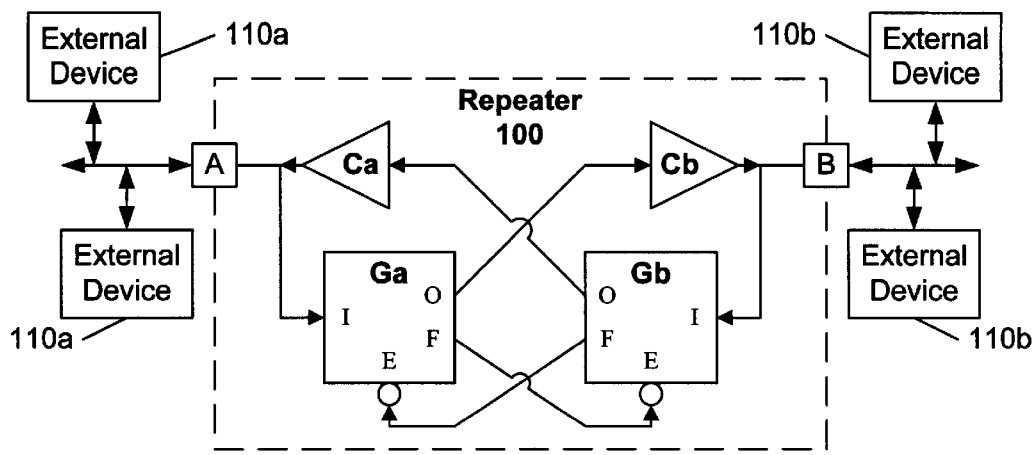
FIG. 1 [Prior Art]
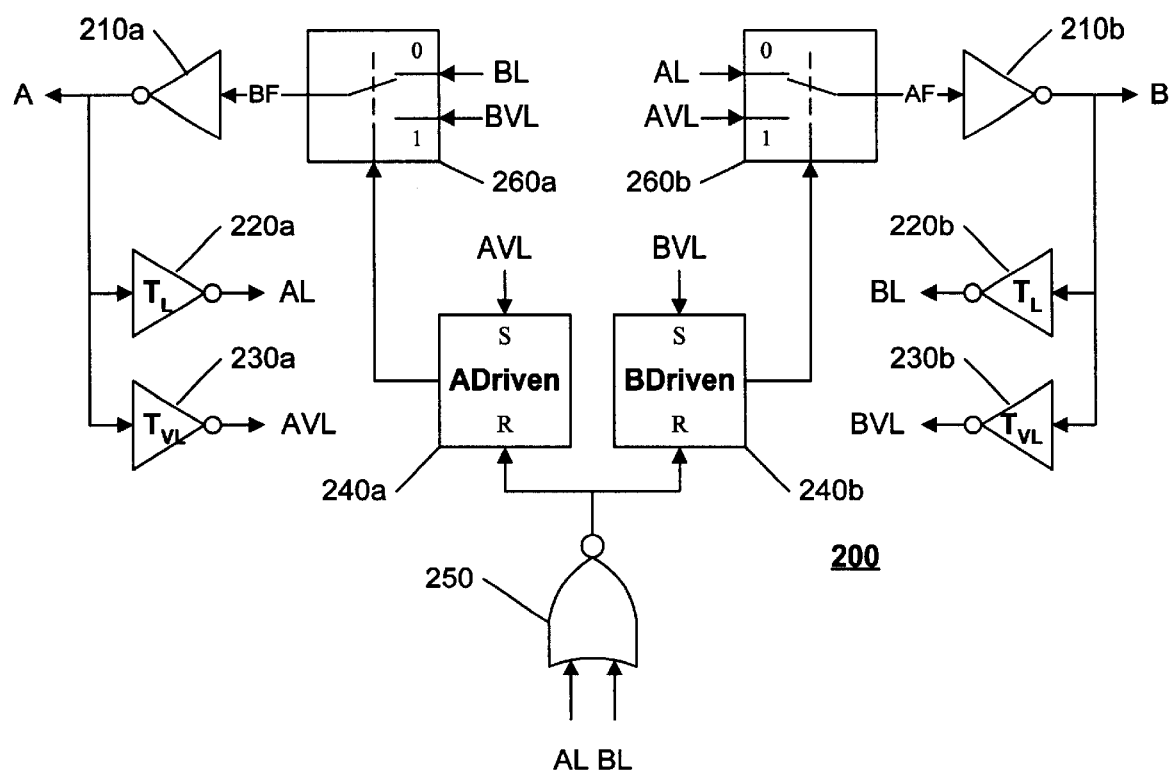
FIG. 2

BIDIRECTIONAL REPEATER USING HIGH AND LOW THRESHOLD DETECTION

CROSS REFERENCE TO RELATED APPLICATIONS

The present application is related to the inventor's application "VOLTAGE STABILIZED LOW LEVEL DRIVER", which was filed on the same day as the present application, and is herein incorporated by reference.

BACKGROUND OF THE INVENTION

1. Field of the Invention

This invention relates to the field of electronics, and in particular to a device that facilitates the interconnection of devices using an I²C interface.

2. Description of Related Art

The Inter Integrated Circuit (I²C) bus developed by Philips Corporation allows integrated circuits to communicate directly with each other via a simple bi-directional 2-wire (plus ground) bus. A device connects to each of the two wires on the bus, one (SData) for the communication of data, and the other (SClk) for the control and synchronization of the communication of data between the devices. Each device is connected in parallel to each of the other devices. Each of the bus lines, SData and SClk, function as a wired-AND of all the lines on the bus. The output of each device is configured as an open-collector/open-drain device, and one or more pull-up resistors maintain a 'soft' logic high value on the bus while the bus is in the quiescent state. When a device desires access to the bus, the device pulls the bus to a logic low value, via the open-collector/open-drain device that is placed in a conductive state to ground potential.

To facilitate a high speed data transfer, the I²C specification limits the maximum capacitive loading on the bus, thereby limiting the maximum length of the bus. The specified maximum capacitive loading is 400 pf, which limits the bus length to a few meters. The 82B715 integrated circuit from Philips Semiconductors is an I²C bus extender that allows for routing of the bus beyond the specified maximum length. The 82B715 offers a current gain of ten from the input to the output, thereby providing a capacitive reduction of ten to the bus on the input side of the bus extender. By placing a bus extender at each end of a long length of wire, only one tenth of the capacitance of the wire appears as a load to the I²C bus or device at each end of the long length of wire. Note, however, that because of the current gain, the output of each 82B715 at either end of the long length of wire is not I²C compatible, because the I²C specification also limits the maximum current that any device can place on the I²C bus. Note, also, that this lack-of-I²C-compatibility provides an advantage with regard to the choice of media between the pair of 82B715s. In lieu of the long length of wire between the pair of 82B715s, for example, a fiber optic or other media can be used.

A repeater is distinguished from an extender in that a repeater is conventionally defined as a device that reshapes a transmitted signal along the transmission path, and supports the transmission protocol and constraints on both sides of the repeater. A repeater is placed, for example, at the midpoint of a length of bus line, to reduce the loading on the half of the bus at its input, and to condition the signal for transmission to the other half of the bus. A typical uni-directional repeater comprises an input inverter that places little load on the input, and an output inverter comprising a driving inverter that is capable of driving a substantial load.

In a bi-directional configuration, wherein the same wire is used to both transmit and receive, a bus repeater appears as a pair of oppositely-oriented uni-directional repeaters that are wired in parallel to each other. Because the output of one uni-directional repeater is connected to the input of the other unidirectional repeater, a bi-directional repeater must be configured to distinguish an externally generated event on the bus from an internally generated event, to preclude a latch-up. Such a latch-up is caused when an input event that is propagated in one direction is interpreted as an input event from the other direction, and re-propagated to the original input to the bi-directional repeater. When the originator of the event ceases the event, this cessation must also be propagated in the same direction as the propagation of the original input event.

Conventional bi-directional repeaters typically include control logic that determines which side of the repeater is receiving a driving signal, and thereafter blocks any input from the opposite side of the repeater until the first side of the repeater no longer receives the driving signal. FIG. 1 is an example block diagram of a conventional bi-directional repeater 100, such as taught by U.S. Pat. No. 5,923,187, "MULTIDIRECTIONAL DATA TRANSMISSION DEVICE", issued on Jul. 3, 1999 for Philippe Maugers, assigned to U.S. Philips Corporation, and incorporated by reference herein. Two uni-directional buffers Ca, Cb are controlled by two control devices Ga, Gb. When a control device Ga, Gb is enabled, a path is provided between the input I and the output O of the control device; otherwise, the path is blocked between the input I and the output O. Initially, with both inputs A and B in the inactive state, both gates Ga and Gb are enabled, thereby connecting the node A to the input of buffer Cb, and connecting the node B to the input of buffer Ca. The buffers Ca, Cb are non-inverting, and therefore the output of each is the inactive state, consistent with each node A, B. It is assumed herein that an active state overcomes the presence of an inactive state on the bus, such as a bus that operates as a logic-AND gate, and the active state is low. Alternatively, albeit rarely used, the active state may be high, and the bus operates as a logic-OR gate.

When one of the nodes, node A for example, transitions to the active state, via a driving signal from an external device 110a, the control device Ga recognizes this transition as the "first" transition, and asserts its F output, which disables the control device Gb. Because Ga remains enabled, the active state of node A is communicated to node B, and the external devices 110b, via the enabled device Ga and the buffer Cb. This active state at node B, however, is not communicated to the buffer Ca, because the gate Gb is disabled. Thus, node A is free to return to the inactive state when the external stimuli from device 110a that drove it to the active state is removed. After node A returns to the inactive state, and this inactive state is communicated to node B and the external devices 110b, control device Ga re-enables device Gb.

Note that, in the above example, if the control device Gb had been enabled, the propagated active state at node B would have been coupled to the buffer Ca, thereby internally driving the node A into the active state. Thereafter, when the external stimuli from device 110a that initially drove node A into the active state is removed, node A would have remained in the active state, being driven by the now-latched active state from node B through devices Gb and Ca. By decoupling the input B on one side of the repeater 100 when the other side A of the repeater 100 is active, via the control device Ga, this latching problem is avoided.

As is evident to one of ordinary skill in the art, the conventional repeater that decouples one side of the repeater when the other side is active presumes that only one side of the repeater is going to be active at any point in time. Or, if both sides are active, the first side to be active prevails. If, in the prior example, node B is externally driven to the active state by a device 110b, this active state will not be propagated to node A until after node A re-enters the inactive state and re-enables the control device Gb. Thus, on the B side of the repeater 100, a continuous active state will be present from the time that node A enters the active state until the time that the node B leaves the active state. Whereas, on the A side of the repeater 100, node A will be driven to the active state by its external stimuli, then enter the inactive state when the stimuli is removed, then re-enter the active state when the control device Gb is re-enabled, until the time that the node B leaves the active state. That is, devices 110a on the A side of the repeater 100 will see a transition that the devices 110b on the other side of the repeater 100 will not see. This inconsistency will, in general, lead to anomalous performance, because the repeater 100 is not truly acting as a mere reshaping device.

Preferably, a repeater is "transparent" to devices on either side. That is, although a repeater allows for improved bus performance, its presence on the bus should be undetectable. If the bus is a wired-AND bus, for example, a logic-low value must be propagated and maintained at both sides of the repeater for as long as any of the devices on the bus are driving the bus to the logic-low value. Thus, in the example above, the operation of the repeater 100 relative to the B side properly reflects a wired-AND operation, whereas the operation on the A side of the repeater 100 does not.

Some specifications, and in particular the I²C specification, rely upon a consistent performance in the presence of a simultaneous assertion of the active state by more than one device. In the I²C specification, for example, the synchronization of the clock signal among multiple devices is determined by the time that a first device pulls the bus low, and the time that a last device ceases pulling the bus low. The prior art repeater, discussed above, fails to comply with this specification, or any specification that is based on an active-low, wired-AND operation.

BRIEF SUMMARY OF THE INVENTION

It is an object of this invention to provide a bi-directional repeater device for a wired bus that is substantially transparent to devices on the bus. It is a further object of this invention to provide a bi-directional repeater device that provides a wired-AND function to the bus on both sides of the repeater device. It is a further object of this invention to provide a bi-directional repeater device that has an improved turn-on transition time.

These objects and others are achieved by providing a repeater that employs multiple threshold detectors to distinguish between signals from external devices and signals generated within the repeater. Signals that are sent from the repeater are configured to be between two threshold levels, so that a detector at one threshold level will detect an active signal, but the detector at the other threshold level will not detect an active signal. When an external signal is received on one side (A) of the repeater, it is propagated to the other side (B) of the repeater, and at the same time, the other side (B) of the repeater is configured to only propagate external signals back to the first side (A). In this manner, the internally generated signal from one side (A) is not propagated back to the same side (A), and a latch-up is avoided. In like manner, when an external signal is received at the other side (B), the first side (A) of the repeater is configured to propagate only externally generated signals. If both sides of the repeater are externally driven, the active signal is propagated to both sides of the repeater, thereby emulating the response that would be provided by a wired bus without a repeater.

BRIEF DESCRIPTION OF THE DRAWINGS

The invention is explained in further detail, and by way of example, with reference to the accompanying drawings wherein:

FIG. 1 illustrates an example block diagram of a prior art bus repeater.

FIG. 2 illustrates an example block diagram of a bus repeater in accordance with this invention.

Throughout the drawings, the same reference numerals indicate similar or corresponding features or functions.

DETAILED DESCRIPTION OF THE INVENTION

Figure 3:
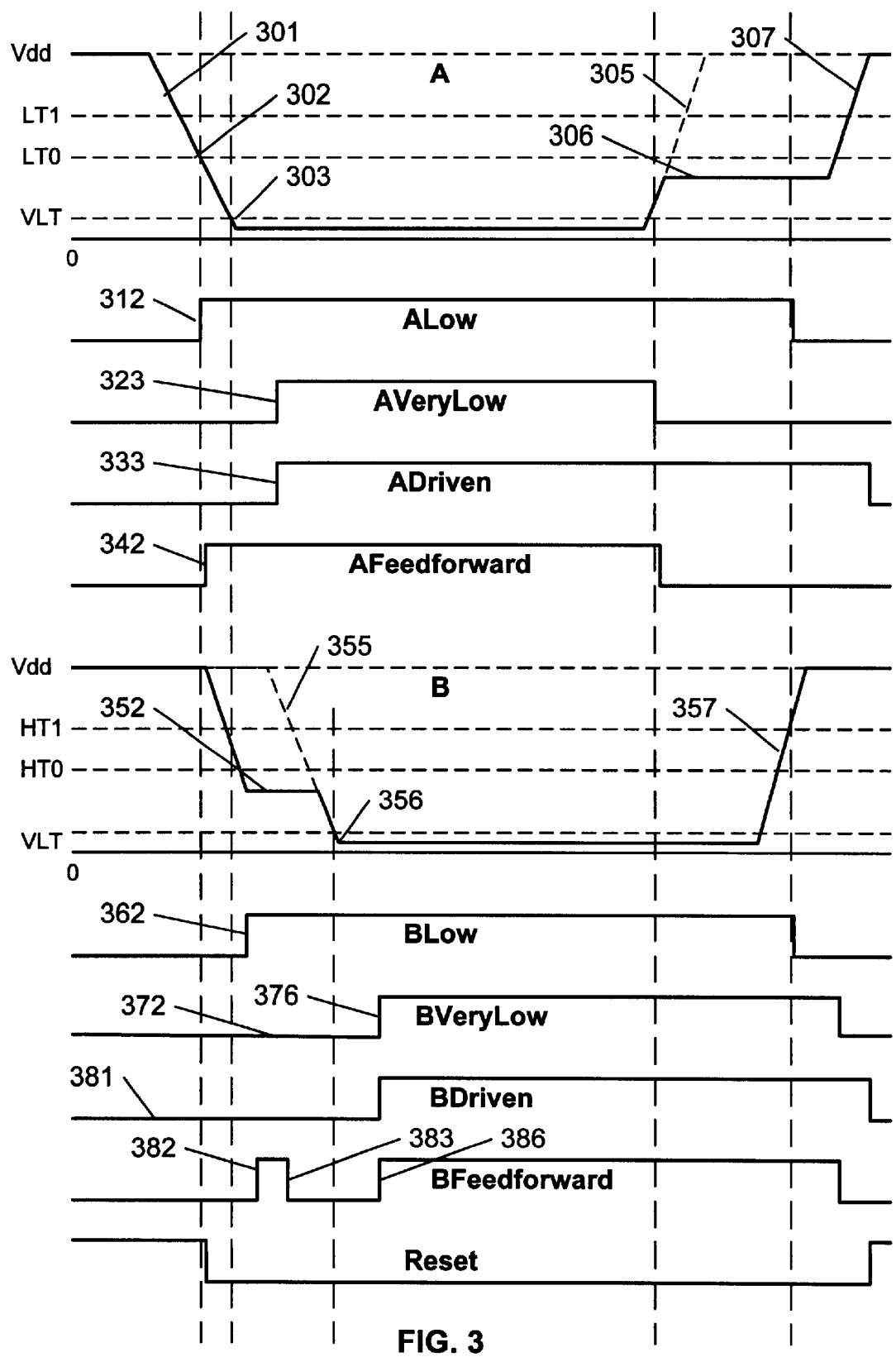
FIG. 3 illustrates an example timing diagram of a bus repeater in accordance with this invention.

The subject invention is presented hereinafter in the context of a wired-AND bus with a high voltage (nominally $V_{dd}=3–10$ v) inactive state, and a low voltage (nominally below $V_{dd}/2$) active state. As will be evident to one of ordinary skill in the art, a complementary structure can be formulated for use in a wired-OR, active-high, bus as well.

FIG. 2 illustrates an example block diagram of a bus repeater 200 in accordance with this invention. The repeater 200 is symmetric, and includes a bus driver 210, a first detector 220 that is configured to detect a voltage below a "low" threshold voltage, a second detector 230 that is configured to detect a voltage below a "very low" threshold voltage, and a set-reset latch 240, whose function is discussed further below. Each of the devices 210–240 in the bus repeater 200 are labeled as either (a) or (b), corresponding to the "A" and "B" sides of the repeater 200, for ease of reference hereinafter.

The bus driver 210 is specifically configured to provide an active driving signal that is between the "low" threshold and "very low" threshold in response to an active-high input, and to provide an open-collector/open-drain inactive state in response to an inactive-low input. Although a variety of embodiments of a bus driver 210 that provides a specified low-voltage output are available to one of ordinary skill in the art, a driver as disclosed in copending U.S. patent application "VOLTAGE STABILIZED LOW LEVEL DRIVER", Ser. No. 09/642,181, filed on Aug. 17, 2000 for Alma Anderson and Paul Andrews, incorporated herein by reference, provides a preferred embodiment. The driver of the referenced application provides a stable voltage output under a wide range of operating conditions. Preferably, the driver 210 provides a "low" voltage output that is about a quarter of the supply voltage, in an environment wherein the conventional bus drivers pull the bus low via a switching device that pulls the bus down to near ground potential. This low voltage output is determined in dependence upon the threshold voltages that are used in the detectors 220 and 230, as discussed further below.

The detector 220 is a conventional logic level detector, preferably with hysterisis, such as provided by a conventional Schmitt-trigger device. Nominally, this detector 220 is configured to switch at half the supply voltage, with +/−20% hysterisis. That is, a transition from high to low at the input effects a transition at the output, from low to high, when the voltage at the input falls below 0.3 of the supply voltage (half less 20%), and a transition from low to high at the input effects a transition at the output, from high to low, when the voltage at the input rises above 0.7 of the supply voltage (half plus 20%). The hysterisis provides noise immunity by substantially ignoring any fluctuations on the input that do not extend across the entire range between the two hysterisis levels (0.3 and 0.7).

The detector 230 is a special purpose device that does not assert an output until the input voltage drops below a "very low" voltage, relative to the aforementioned "low" voltage output of the driver 210. The detector 230 preferably comprises a comparator that compares the input voltage to a well defined reference voltage, such as a band-gap reference, common in the art, and is discussed further below with regard to FIG. 5. In a preferred embodiment, the reference voltage is approximately a half volt, based on $I^2C$ current and impedance specifications corresponding to an active-low voltage of 0.4 volts.

The outputs of the detectors 220(a) and 230(a) are termed "A-Low" (AL) and "A-Very-Low" (AVL), and the outputs of the detectors 220(b) and 230(b) are termed "B-Low" (BL) and "B-Very-Low (BVL), respectively. FIG. 3 illustrates an example timing diagram reflecting these signals, relative to the voltage on nodes A and B.

As illustrated in FIG. 3, nodes A and B are initially at a high voltage (nominally "Vdd"). In a quiescent state, the drivers 210 of FIG. 2 are inactive and the node A remains at the high voltage until driven low by an external device. At this high voltage, the output of the low and very-low voltage detectors 220, 230 (AL, AVL, BL, BVL) are all at a logic low state, indicating that the nodes A and B are neither low nor very-low. At 301, the voltage at node A drops, in response to an external stimuli that pulls the bus low.

The example timing diagram indicates three threshold levels, LT1, LT0, and VLT. LT0 and LT1 indicate the two Schmitt-trigger hysteresis levels associated with the low-detector 220. The low-detector 220 asserts the "input-low" signal (AL, BL) when the input (A, B) drops below LT0, and dc-asserts the "input-low" signal (AL, BL) when the input (A, B) rises above LT1. The very-low-detector 230 asserts the "input-very-low" signal (AVL, BVL) when the input (A, B) drops below VLT, and de-asserts it when the input (A, B) rises above VLT. As discussed further below, in a preferred embodiment, the detector 220 does not exhibit hysteresis, per se.

As illustrated in FIG. 3, when, at 302, the voltage at node A drops below LT0, the A-Low AL signal is asserted, at 312. When, at 303, the voltage at node A continues to drop to below VLT, the A-Very-Low AVL signal is asserted, at 323. As discussed below with regard to FIG. 5, to minimize false triggering, the detector 230 does not assert the "input-very-low" signal until the input has remained low for a sufficient period of time, to assure that an excursion below VLT was not merely a noise event. Thus, a substantial delay exists between the time 312 that the AL signal is asserted and the time 323 that the AVL signal is asserted.

Figure 4:
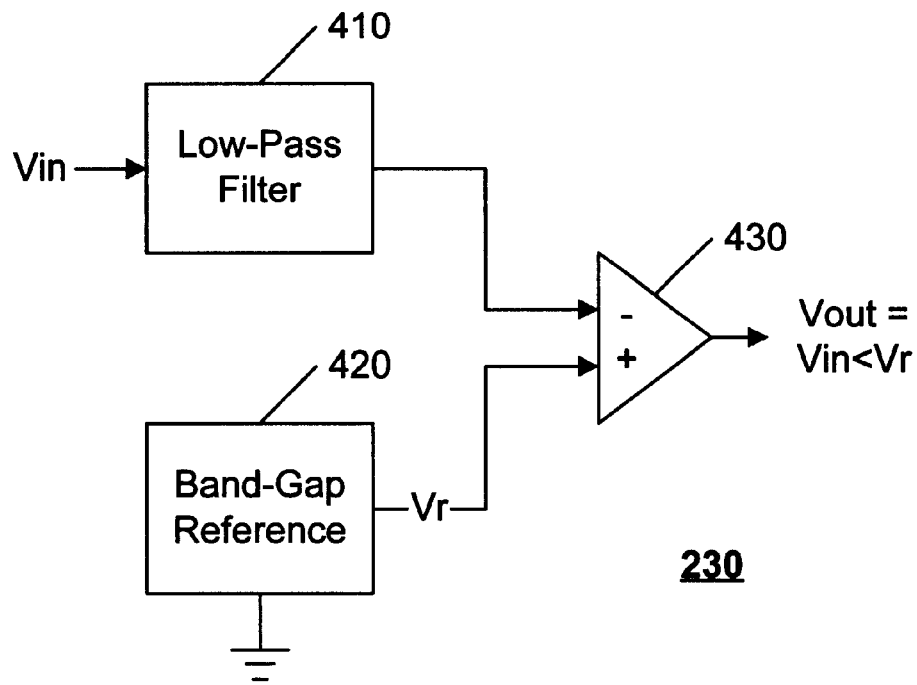
FIG. 4 illustrates an example block diagram of an alternative bus repeater in accordance with this invention.

Note that, because the driver 210 of FIG. 2 is configured to provide an active signal level that is between the lower threshold LT0 of the low-detector 220 and the threshold VLT of the very-low-detector 230, a repeater can by formed by merely propagating the output AVL, BVL of the very-low-detector 230a, 230b to the corresponding other-side-driver 210b, 210a, as illustrated in FIG. 4. In this manner, externally driven events are propagated to the other-side, while internally driven events are not propagated back to the originating side, thereby avoiding latch-up. Note that this construct allows the propagation of an external event from either side of the repeater 200, including a simultaneous propagation in both directions, thereby effecting a true wired-AND function. As noted above, however, for proper noise immunity, there is often a substantial delay between the time 303 that the input drops below VLT and the time that the "input-very-low" signal AVL, BVL, is asserted. In addition to degrading performance, this propagation delay may exceed the specifications of common bus standards and protocols.

FIG. 2 illustrates a preferred embodiment of this invention which minimizes the propagation delay from one side (A, B) of the repeater 200 to the other (B, A), while still maintaining a true wired-AND function and still avoiding latch-up. This aspect of the invention is premised on the observation that, if the repeater is in the quiescent state, any change of value on the nodes A, B must be from an external source, and thus should be propagated (as quickly as possible). A rapid propagation can be achieved by propagating the active state as soon as it is detected by the low-detector 220. However, the propagation of the output of the low-detector 220, such as caused when the driver 210 asserts an active-low, can cause latch-up, as discussed above. In a preferred embodiment of this invention, the repeater 200 includes two latches 240a, 240b that are used to control the propagation of signals, to avoid latch-up, based on whether the side is being driven by an external source or by the internal driver 210.

The latches 240 are initially reset (to logic-0) when the bus is in the quiescent state (both nodes A and B having a high voltage), as illustrated by the NOR-gate 250 (neither A nor B having a low voltage). The state of the latches 240 determine which signal is propagated to the other side of the repeater 200, via the switches 260. In the reset state, the output of the low-detectors 220a, 220b are propagated to the corresponding bus drivers 210b, 210a, thereby providing a minimum propagation delay from input-side (A, B) to output-side (B, A).

Once the driving signal is propagated, the propagated signal must be blocked from driving the bus driver on the originating side, to avoid latch-up. The latches 240 are configured to be set when a driving signal is detected, and the switches 260 are configured to block the propagation of the output of the corresponding driver 210 back to the originating side. When the latch 240 is set, the corresponding switch 260 is configured to propagate only externally driven signals, as detected by the very-low-detector 230. Returning to FIG. 3, while the state of the B-Driven latch 240b (of FIG. 2) is at a logic-0, at 381, the output A-Feedforward AF of the switch 260b corresponds to the output A-Low of the low-detector 220a. Thus, when, at 312, the A-Low signal is asserted, the A-Feedforward signal is asserted, at 342, and the bus-driver 210b drives the B node down to a voltage between LT0 and VLT, at 352. Thereafter, the voltage at node A continues to below VLT, at 303, and the A-Very-Low AVL output of the very-low-detector 230a is asserted, thereby setting the A-Driven latch 240a to a logic-1, at 333. This state of the A-Driven latch 240a sets the switch 260a such that the output BVL of the very-low-detector 230b is coupled to the A-side bus driver 210a. Note that when the external input to node A is propagated to the B-side bus driver 210b, the corresponding low value on node B causes the B-Low signal to be asserted, at 362. But, because the driver 210b is configured to provide a low voltage that is above VLT, the output of the very-low-detector 230b is not asserted, at 372. While the A-Driven latch is clear, the B-Low signal is propagated to the input of the A-side driver 210a, via the switch 260a, as shown at 382 in FIG. 3. As soon as the A-Driven latch is set, at 333, the multiplexer 260a blocks the propagation of the B-Low signal to the B-Feedforward input of the driver 210a, at 383. Because the output B-Very-Low of the very-low-detector 230b is not asserted when the output signal on node B is caused by the internal driver 210b, the A-side bus driver 210a re-enters the inactive state. Thereafter, assuming no other external events, when the driving signal to node A de-asserts the active-low signal, node A is free to return to the inactive state, as indicated by the dotted line 305, and this inactive state is propagated (not illustrated) to the B-side, via the switch 260b. Thus, the B-side of the repeater 200 follows the external stimuli to the A-side, with minimal delay, and without latch-up.

FIG. 3 illustrates the operation of the repeater 200 when a second external event, on the B-side of the repeater 200, occurs. As indicated by the dotted line at 355, an external device on the B-side of the repeater 200 pulls the bus low. This external signal forces node B below its prior low value 352, to a level below VLT, at 356. This causes the very-low-detector 230b to assert the B-Very-Low BVL signal, at 376. Because the switch 260a is set to propagate the BVL signal, the assertion of the BVL signal causes the driver 210a to assert an active-low signal on the A-side of the bus. This assertion has no effect while the A-side external device is pulling the bus low, but does have an effect, at 306, when the A-side external device de-asserts the active-low. Note that while the B-side is externally driven low, node A remains at a low level, albeit at the low level set by the bus-driver 210a. To an external device, which will typically use a conventional Schmitt trigger detector such as the low-detector 220, the output of the repeater A will be detected as a continuous low, corresponding to the A-Low signal of FIG. 3. Thus, the repeater 200 effects a true wired-AND function on both sides of the repeater 200.

When the external stimuli is removed from node B, at 357, node B is free to return to the inactive state, because the Bdriven latch 240b will have been set by the assertion of the BVL signal, and the A-Low signal will not be propagated back to the bus-driver 210b. After node B rises above VLT, the detector 230b de-asserts the BVL signal, and, via the switch 260a, the bus-driver 210a ceases its assertion of an active-low level onto the A-side of the bus, at 307. When the nodes A, B rise above the LT1 level, the corresponding AL and BL signals are de-asserted, and the latches are reset, via the NOR-gate 250.

Figure 5:
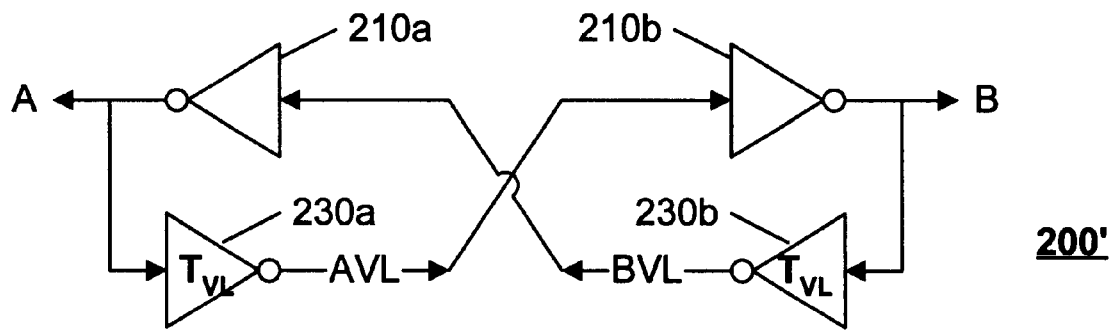
FIG. 5 illustrates an example block diagram of a detector having a settable threshold level in accordance with this invention.

FIG. 5 illustrates an example block diagram of a detector 230 having a settable threshold level. The detector 230 comprises a filter 510, a reference source 520, and a comparator 530. The filter 510 reduces the effects of noise on the input Vin by, for example, averaging or integrating the input voltage Vin. This assures that short-duration (high-frequency) noise spikes that might erroneously drive the input Vin below the reference voltage Vr are not propagated to the output voltage Vout. In so doing, however, when the input voltage Vin is purposely driven below Vr, the output of the filter 510 will not be less than the reference voltage Vr until the input voltage Vin has been below Vr for a sufficient time duration to affect the average voltage. This delay corresponds to the aforementioned propagation delay between the times 303 and 323 in FIG. 3.

The reference source 520 is set to provide a reference voltage Vr that corresponds to the aforementioned desired very-low-threshold voltage VLT. In a preferred embodiment, for stability, a band-gap reference source, common in the art, is used as the reference source 520. In an $I^2C$-compliant repeater 200, the reference voltage Vr is set to approximately 450 millivolts. The comparator 530 compares the reference voltage with the filtered input voltage and asserts a logic-1 output whenever the filtered input voltage is below the reference voltage.

Note that although this invention has been presented in the context of a repeater, the principles of this invention, i.e. the use of multiple thresholds to distinguish among sources of a signal, is not necessarily limited to its use in a repeater. For example, in a bus system having multiple classes of users, each class having a different set of data access or data modification rights, a multi-threshold detection scheme as presented herein could be used to distinguish among the classes of users. In like manner, a device can be configured to provide multiple levels of output, as a group addressing scheme, or as an address-preamble. The other devices use the different voltage levels associated with the same logic level to distinguish among messages of different types, or different addressees.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in certain embodiments, it may be desirable to reset each latch 440 whenever the external driving signal on the corresponding side of the repeater de-asserts the active-low state, (e.g. at 305 in FIG. 3). This reset can be provided by the inverse of very-low signals AVL, BVL being applied to the reset inputs of the A-Driven 240a and B-Driven 240b latches, respectively, and eliminating the need for the NOR-gate 250. Alternatively, this alternate reset could be used only when both sides of the repeater 200 are simultaneously driven. Other modifications and optimizations, including changes to the specific timings and combinations of signals illustrated in this disclosure, will be evident to one of ordinary skill in the art, and are included within the scope of the following claims.

We claim:

1. A repeater for use on a bus that uses a binary system of a first logic value and a second logic value to communicate data among a plurality of devices, the repeater comprising:
   a pair of drivers that each provide the first logic value at a first voltage level that differs from a second voltage level that each of the plurality of devices use to communicate the first logic value, and
   a pair of first detectors that are each configured to propagate the first logic value to a corresponding driver of the pair of drivers, only if the first logic value is provided by any of the plurality of devices, based on a distinction between the first voltage level and the second voltage level.

2. The repeater of claim 1, further comprising
   a pair of second detectors that are each configured to propagate the first logic value, from either a driver of the pair of drivers or from a device of the plurality of devices, and
   a pair of switches, each switch
      operably coupled to a corresponding driver of the pair of drivers, a corresponding first detector of the pair of first detectors, and a corresponding second detector of the pair of second detectors, and being configured to selectively couple the corresponding driver to either of the corresponding first detector or second detector.

3. The repeater of claim 2, further comprising
a pair of control devices, each configured to control a corresponding switch of the pair of switches so as to:
couple the second detector to the corresponding driver, to facilitate a rapid propagation of the first logic value, and
couple the first detector to the corresponding driver, to avoid a latch-up of the repeater.

4. The repeater of claim 3, wherein
each control device comprises
a latch that is set in dependence upon an output of the other first detector of the pair of detectors.

5. The repeater of claim 1, wherein
each first detector includes:
a source of a reference voltage that is between the first voltage level and the second voltage level, and
a comparator that compares an input voltage value to the reference voltage to distinguish receipt of the first logic value from any of the plurality of devices.

6. The repeater of claim 5, wherein
each first detector further includes
a filter that filters the input voltage value before it is provided to the comparator.

7. The repeater of claim 2, wherein
each second detector includes a Schmitt-trigger device.

8. The repeater of claim 1, wherein the repeater is compatible with the I²C bus specification.

9. A system that uses a binary system of a first logic value and a second logic value to communicate data among a plurality of devices, the system comprising:
at least one first device that communicates the first logic value at a first voltage level,
at least one second device that communicates the first logic value at a second voltage level that differs from the first voltage level, and
at least one detector that includes a threshold device having a threshold value that lies between the first voltage level and the second voltage level, to facilitate a distinction between the first device and the second device;
wherein the at least one first device and the at least one detector comprise a repeater, the repeater being configured to propagate the first logic value from the at least one second device unconditionally, and to selectively propagate the first logic value from the at least one first device;
wherein the repeater comprises
a pair of drivers that each provide the first logic value at the first voltage level, and
a pair of first detectors that are each configured to propagate the first logic value to a corresponding driver of the pair of drivers, only if the first logic value is provided by the at least one second device, based on a distinction between the first voltage level and the second voltage value.

10. The system of claim 9, wherein
each of the pair of first detectors includes:
a source of a reference voltage that is between the first voltage level and the second voltage value, and
a comparator that compares an input voltage value to the reference voltage to distinguish receipt of the first logic value from the at least one second device.

11. The system of claim 10, wherein each of the pair of first detectors further includes
a filter that filters the input voltage value before it is provided to the comparator.

12. The system of claim 9, wherein
the repeater further comprises:
a second pair of detectors that are each configured to propagate the first logic value, from either the at least one first device or the at least one second device, and
a pair of switches, each switch
operably coupled to a corresponding driver of the pair of drivers, a corresponding first detector of the pair of first detectors, and a corresponding second detector of the pair of second detectors, and
being configured to selectively couple the corresponding driver to either of the corresponding first detector or second detector.

13. The system of claim 12, wherein
the repeater further comprises
a pair of control devices, each configured to control a corresponding switch of the pair of switches so as to:
couple the second detector to the corresponding driver, to facilitate a rapid propagation of the first logic value, and
couple the first detector to the corresponding driver, to avoid a latch-up of the repeater.

* * * * *